(12) United States Patent
LeMond et al.

(10) Patent No.: US 9,760,426 B2
(45) Date of Patent: Sep. 12, 2017

(54) DETECTING ANOMALOUS ACCOUNTS USING EVENT LOGS

(71) Applicant: Microsoft Technology Licensing, LLC, Redmond, WA (US)

(72) Inventors: Jennifer LeMond, Kirkland, WA (US); Haoyang Duan, Seattle, WA (US); Xiaoming Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 14/723,648

(22) Filed: May 28, 2015

(65) Prior Publication Data

US 2016/0350165 A1 Dec. 1, 2016

(51) Int. Cl.
| | | |
|---|---|---|
| *G06F 17/00* | (2006.01) | |
| *G08B 23/00* | (2006.01) | |
| *G06F 11/07* | (2006.01) | |
| *G06F 21/31* | (2013.01) | |
| *G06F 21/41* | (2013.01) | |
| *G06F 21/55* | (2013.01) | |

(52) U.S. Cl.
CPC ........ *G06F 11/079* (2013.01); *G06F 11/0751* (2013.01); *G06F 11/0787* (2013.01); *G06F 21/316* (2013.01); *G06F 21/41* (2013.01); *G06F 21/552* (2013.01); *G06F 2221/033* (2013.01); *G06F 2221/2151* (2013.01)

(58) Field of Classification Search
CPC ............. H04L 63/1416; H04L 63/1408; H04L 63/1441; H04L 63/1458; G06F 21/552
USPC ..... 713/153–154, 187–188, 193–194; 726/1, 726/13, 22–33; 709/206, 249, 389
See application file for complete search history.

(56) References Cited

U.S. PATENT DOCUMENTS

| | | |
|---|---|---|
| 5,857,190 A | 1/1999 | Brown |
| 5,987,611 A | 11/1999 | Freund |

(Continued)

FOREIGN PATENT DOCUMENTS

| | | |
|---|---|---|
| CN | 102325062 A | 1/2012 |
| WO | 2013036269 A1 | 3/2013 |

OTHER PUBLICATIONS

Roberts, Carrie, "Discovering Security Events of Interest Using Splunk", In White Papers, Aug. 12, 2013, 26 pages.

(Continued)

*Primary Examiner* — Evans Desrosiers
(74) *Attorney, Agent, or Firm* — International IP Law Group, PLLC

(57) ABSTRACT

The claimed subject matter includes techniques for detecting anomalous accounts. An example method includes receiving, via a processor, a list of monitored machines and event logs including logons for the list of monitored machines for a predetermined window of time. The example method also includes generating, via the processor, a baseline based on the event logs for the predetermined window of time. The example method also includes collecting, via the processor, daily logon events after the predetermined time and comparing the daily logon events to the baseline. The method further includes detecting, via the processor, an anomalous account based on a difference of logon events of the anomalous account from the baseline. The method also includes displaying, via the processor, the detected anomalous account.

9 Claims, 8 Drawing Sheets

(56) References Cited

U.S. PATENT DOCUMENTS

| | | | |
|---|---|---|---|
| 6,115,680 | A | 9/2000 | Coffee et al. |
| 6,125,392 | A | 9/2000 | Labatte et al. |
| 7,472,422 | B1 | 12/2008 | Agbabian |
| 7,653,633 | B2 | 1/2010 | Villella et al. |
| 7,778,979 | B2 | 8/2010 | Hatonen et al. |
| 7,809,670 | B2 | 10/2010 | Lee et al. |
| 8,181,248 | B2 * | 5/2012 | Oh .................. G06F 21/552 709/224 |
| 8,352,790 | B2 | 1/2013 | Nakagawa et al. |
| 8,566,956 | B2 | 10/2013 | Slater |
| 8,776,227 | B1 | 7/2014 | Glick et al. |
| 8,806,593 | B1 | 8/2014 | Raphel et al. |
| 8,875,294 | B2 | 10/2014 | Golavanov |
| 8,887,286 | B2 | 11/2014 | Dupont et al. |
| 2005/0010610 | A1 * | 1/2005 | Nishimura ........ G06F 17/30067 |
| 2012/0079596 | A1 | 3/2012 | Thomas et al. |
| 2014/0208426 | A1 | 7/2014 | Natarajan et al. |
| 2014/0228111 | A1 | 8/2014 | Yun |
| 2014/0230051 | A1 | 8/2014 | Vallinayagam et al. |

OTHER PUBLICATIONS

International Search Report, for PCT application, PCT/US2016/033392, mailed date: Jul. 29, 2016, 10 pages.

\* cited by examiner

DETECTING ANOMALOUS ACCOUNTS USING EVENT LOGS

BACKGROUND

Event logs provide a nearly complete history of activities within an information technology (IT) environment. Event logs can include logon times, names of created processes, directory paths of processes, and accounts used to connect to a plurality of host machines.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a system for anomalous process detection. The system includes an event log module configured to receive a plurality of event logs. The system also includes a filter module configured to filter the plurality of event logs based on detected process creations. The system can also further include a receiving module configured to receive a directory path and process name for each detected process creation. The system can also include a conversion module configured to convert each directory path to a sequence of integers based on a character count for each sub-directory of the directory path. The system can further include a detection module configured to detect an anomalous process based on a threshold number of matching character counts and matching process names. The system can also further include a display module can also further be configured to display the detected anomalous process.

Another implementation provides for a system for detecting anomalous accounts. The system includes a receiving module to receive a list of monitored machines and event logs including logons for the list of monitored machines for a predetermined window of time. The system can also include a module to generate a baseline based on the event logs for the predetermined window of time. The system can also include a collector module configured to collect daily logon events after the predetermined time and compare the daily logon events to the baseline. The system can also include a detection module configured to detect an anomalous account based on a difference of logon events of the anomalous account from the baseline. The system can also include an update module configured to generate a new baseline by removing older event logs from the baseline based on a predetermined adjustment time and adding new event logs from non-anomalous accounts based on the predetermined adjustment time and comparing daily logon events to the new baseline. The system can also include a display module configured to display the detected anomalous account.

Another implementation provides for a system for generating bubble plot graphs. The system includes a receiving module configured to receive processed event logs including logons of a logon account at a plurality of machines for a predetermined time. The system can also include an aggregator module configured to aggregate the processed event logs for the logon account to generate a total number of logons, and a first and a last logon time for the logon account. The system can also include a graphing module configured to generate a bubble plot graph including a bubble based on the total number of logons and a difference between the first and the last logon time for the logon account and a size of the bubble indicating an inverse difference between the first logon and the last logon for the logon account. The system can also include a display module configured to display the bubble plot graph.

Another implementation provides method for anomalous process detection. The method can include receiving, via a processor, a plurality of event logs. The method can also include filtering, via the processor, the plurality of event logs to detect process creations. The method can further include receiving, via the processor, a directory path and process name for each detected process creation. The method can also further include converting, via the processor, each directory path to a sequence of integers based on character count. The method can also include detecting, via the processor, an anomalous process based on a threshold number of matching character counts. The method can also further include displaying, via the processor, the detected anomalous process.

Another implementation provides for a method for detecting anomalous accounts. The method can include receiving, via a processor, a list of monitored machines and event logs including logons for the list of monitored machines for a predetermined window of time. The method can also include generating, via the processor, a baseline based on the event logs for the predetermined window of time. The method can further include collecting, via the processor, daily logon events after the predetermined time and comparing the daily logon events to the baseline. The method can also further include detecting, via the processor, an anomalous account based on a difference of logon events of the anomalous account from the baseline. The method can also include displaying, via the processor, the detected anomalous account.

Another implementation provides for a method for generating a bubble plot graph. The method includes receiving, via a processor, processed event logs including logons of a logon account at a plurality of machines for a predetermined time. The method can also include aggregating, via the processor, the processed event logs for the logon account to generate a total number of logons, and a first and a last logon time for the logon account. The method can also further include generating, via the processor, a bubble plot graph based on the total number of logons and a difference between a first logon time and a last logon time for the logon account. The method can also include displaying, via the processor, the bubble plot graph.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
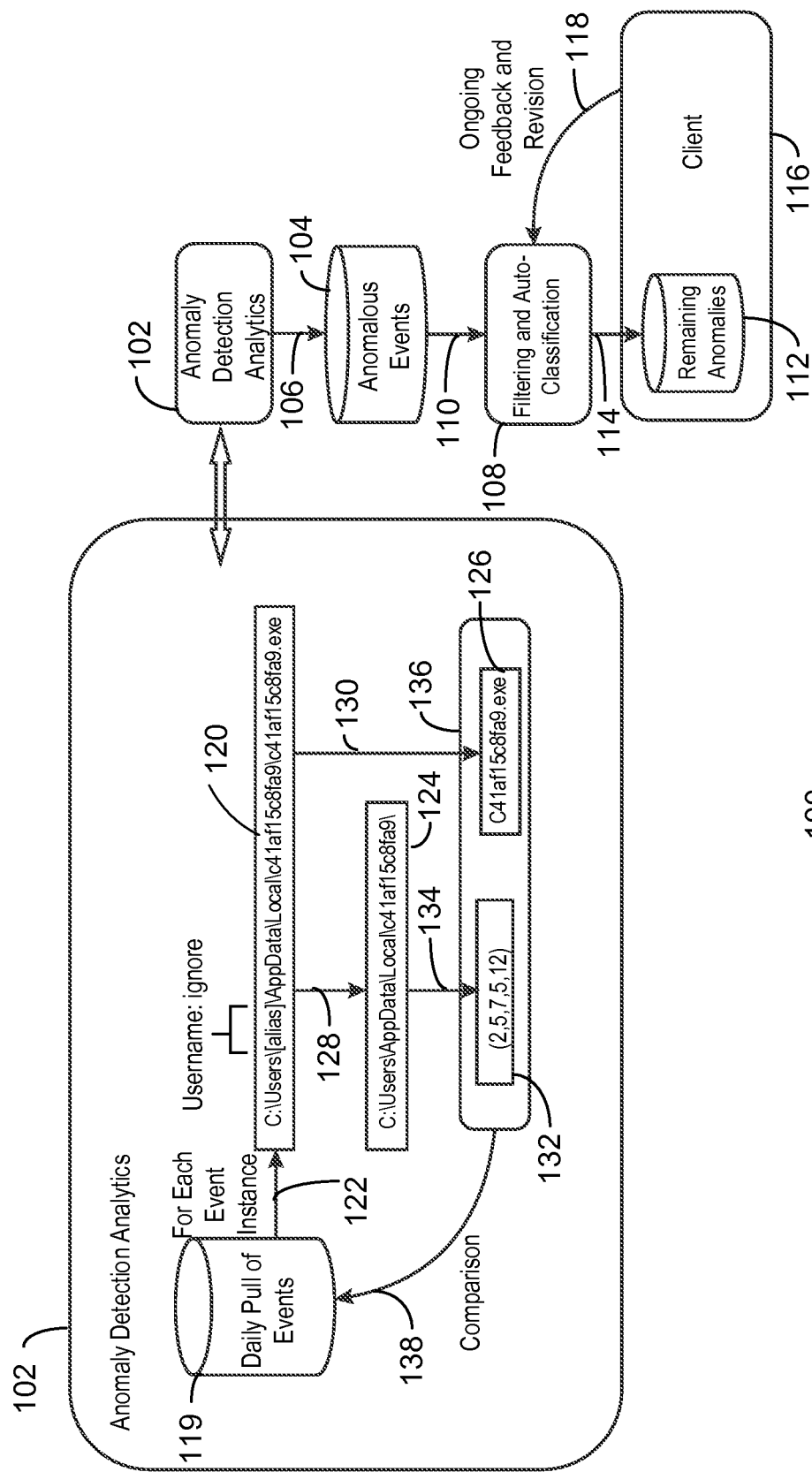
FIG. 1 is a block diagram of an example system for detecting anomalous processes.

Attacks and exposures of vulnerabilities in information technology networks are substantial risks to a corporation's intellectual property and can affect the ability of a corporate enterprise to operate effectively. Event logs that are typically collected daily can be used to view a near complete history of activities within an information technology network, where evidence of attacks and malicious behavior is generally found. However, the volume, variety, and velocity of the event log data limits detection of such activities using conventional analysis and data storage.

This disclosure describes techniques to detect anomalous processes and accounts via processing of a plurality of event logs. In some examples, event logs can include information about process creations, logons, and accounts performing process creations or logons, or the like. A process creation, as used herein, refers to a type of event including information about an instance of a computer program that is being executed. For example, a process creation event can include a security ID of the account, an account logon name, an account domain/computer name, and a logon ID, and can sometimes be referred to as a 4688 Event. A logon, as used herein, refers to a type of event recording the attempted authentication of an account onto a machine. For example, a logon may include a security ID, an account logon name, an account domain/computer name, and a logon ID, and can sometimes be referred to as a 4624 Event. In some examples, anomalous processes can be detected by collecting event logs and comparing character counts of directory paths and process names.

In some examples, a baseline can be generated from a window of time of logon events for a plurality of accounts. For example, the window of time can be weekly, daily, hourly, etc. Anomalous accounts can be detected by comparing logon events for each account accessing a list of machines within the window of time against the baseline. In some techniques, the baseline can be updated at predetermined adjustment times based on recent event logs from non-anomalous accounts detected from the daily logon events. The daily logon events can then be compared against the new baseline.

In some examples, logon events from event logs can be aggregated for a predetermined window of time and a bubble plot graph created to visualize account behavior and emphasize anomalous accounts. Accounts can be represented by bubbles on a graph depicting a total number of logons to any host versus a most recent time of a logon to any machine for the account. In addition, the size of the bubbles can indicate a difference between a first logon time and a last logon time inversely.

The techniques thus enable real-time detection of anomalous account and activities in a large volume of logon data that is otherwise not able to be comprehensively analyzed by users. For example, the event logs can be terabytes in size. Moreover, the techniques include analyzing existing data that is routinely collected. Thus, the techniques do not collect additional data. The techniques also reduce the amount of processing required to detect anomalous behavior and associated accounts. For example, compression can be used to minimize file size. Moreover, the increased efficiency of the detection can further save computer resources by enabling a user to find anomalous behavior or accounts using fewer resources. In addition, the techniques also enable earlier detection of suspicious activities. For example, analysis and visualization of event logs provided herein can improve system security by enabling users to efficiently analyze potential threats in a large amount of data. These techniques are described in more detail herein.

Figure 7:
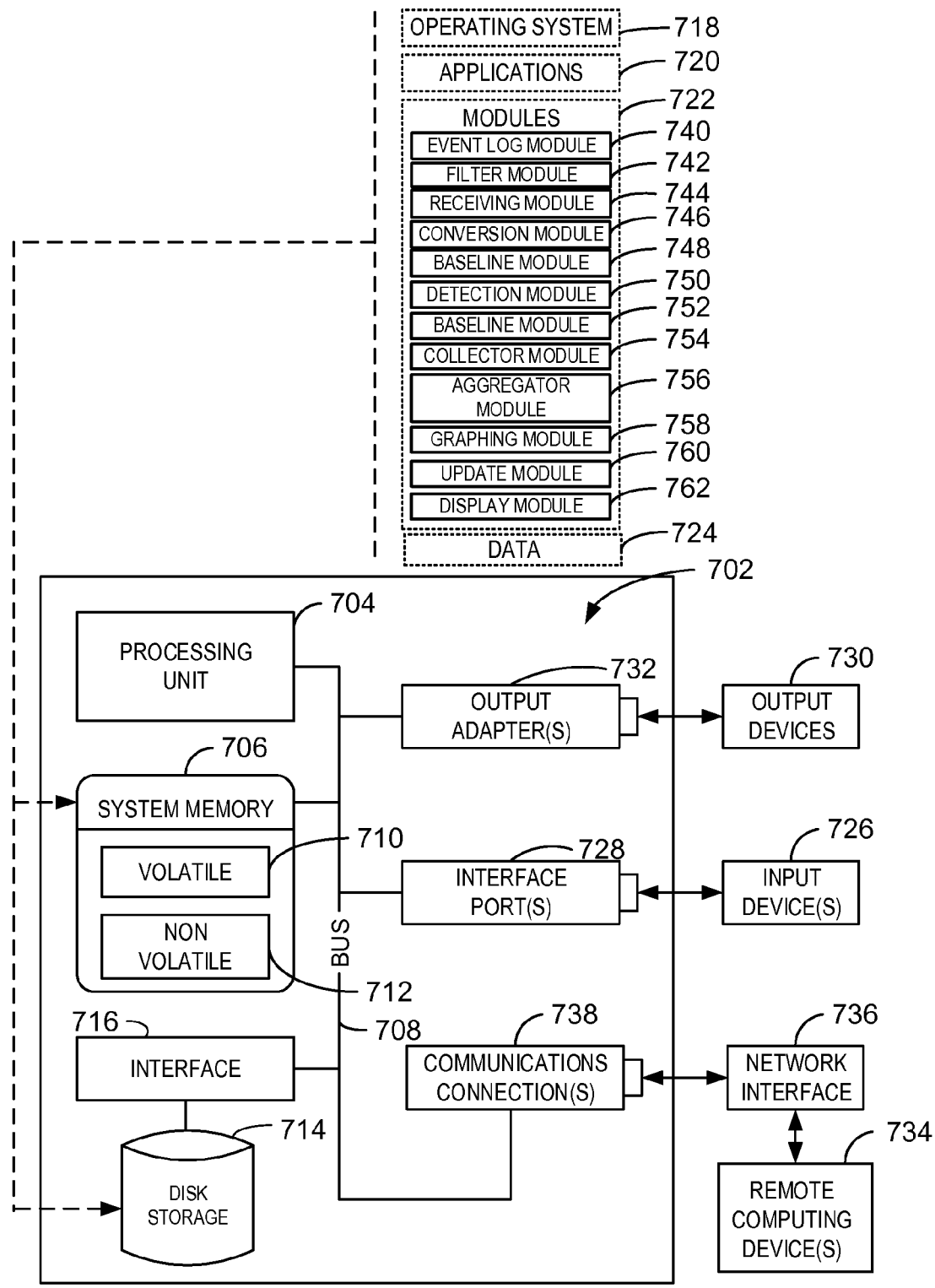
FIG. 7 is a block diagram of an example operating environment configured for implementing various aspects of the techniques described herein.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component. FIG. 7, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media include magnetic storage devices, e.g., hard disk, floppy disk, magnetic strips, optical disk, compact disk (CD), digital versatile disk (DVD), smart cards, flash memory devices, among others. Moreover, computer-readable storage media does not include communication media such as transmission media for wireless signals. In contrast, computer-readable media, i.e., not storage media, may include communication media such as transmission media for wireless signals.

FIG. 1 is a block diagram of an example system for detecting anomalous processes. The example system of FIG. 1 is referred to generally by the reference number 100.

In the example system 100, an anomaly detection analytics module 102 is connected to a store 104 in which anomalous process creations can be stored as indicated by an arrow 106. The store 104 with anomalous process creations is connected to a filtering and auto-classification module 108 as indicated by an arrow 110. The filtering and auto-classification module 108 can filter out known benign processes and automatically classify anomalies based on patterns of processes. For example, the patterns of processes may be associated with grayware. Grayware, as used, herein, refers to processes that behave in a manner that is annoying or undesirable, and yet less serious or troublesome than malware. The filtering and classification module 108 is connected to a store 112 containing anomalies remaining after filtering as shown by arrow 114. The store 112 containing remaining anomalies can also be accessible by a client 116 that can receive and send feedback 118 to the filtering and auto-classification module 108. As shown on the left side of FIG. 1, the anomaly detection analytics module 102 can include a stored daily pull of events 119. The anomaly detection analytics module 102 can also include a full directory path 120 for each instance of an event 122 as indicated by an arrow. The full directory path 120 can be processed to obtain a directory path 124 and process name 126 as indicated by arrows 128 and 130. Any known usernames in the path can be ignored. For example, a full directory path and name 120 of C:\Users\[alias]\AppData\Local\c41af15c8fa9\c41af15c8fa9.exe can be processed to obtain a directly path 124 of C:\Users\AppData\Local\c41af15c8fa9\ and a process name 126 of c41af15c8fa9.exe. The directory path 124 can be processed to obtain a character count 132 of each sub-directory name of the directory path 124 as indicated by an arrow 134. For example, the path C:\Users\AppData\Local\c41af15c8fa9\ can have all characters between slashes replaced with a character count of (2, 5, 7, 5, 12). The character count 132 and process name 126 are included in a comparison 136 to be made against the daily pull of events 119 as indicated by an arrow 138.

In the example system 100, the anomaly detection analytics module 102 can receive a daily pull of events 119 in a storage. For example, the daily pull of events 119 in the storage 119 can include thousands to billions of events collected each day. The events 119 can include process creation events, sometimes referred to as instances of Event 4688. For example, process creation events can document each program that is executed, the account and machine that ran the program and the process that started this process. In some examples, the data size of the collected daily pull of events 119 can be more than ten terabytes of raw data per day. The event logs can be pushed to a plurality of event collector systems and transferred to folders that are shared with a plurality of example processing systems 100. An example system 100 can convert the event logs from a native format such as the Extensible Markup Language (XML) format to a common structured table format. The event logs can then be stored in a storage of a daily pull of events 119. In some examples, the processed event logs can be compressed and inserted into the storage. For example, the event logs can be compressed using the Optimized Row Columnar (ORC) format. In some examples, the storage can use an HDFS format. In addition, the example system 100 can use error-handling and re-run procedures to prevent loss or corruption of data. In some examples, a system monitor application, linked to the example system 100, can oversee the health and maintenance of infrastructure and provide status updates on heartbeats of operating system services, file tracking information, and system statuses.

As shown in FIG. 1, anomaly detection analytics module 102 can process the event logs recording new instances of events 122, for each day for the detection of harmful activities such as malware installations. For example, the event instances may include evidence of such harmful activities. In some examples, the filtering and auto-classification module 108 can filter the process creations based on specific sub-directory paths where malware are likely to be found. For example, the directories can include common sub-directories for a particular operating system. In some examples, the anomaly detection analytics module 102 and the filtering and auto-classification module 108 can label processes with rare-occurring names or directory paths, defined as occurring fewer than a threshold number of times across all hosts in an IT environment, as potentially associated to malware installations. In some examples, the filtering and auto-classification module 108 can ignore user-identified sub-directories. The anomaly detection analytics module 102 can also apply to other events that record directory information, including a new service installation event, sometimes referred to as Event 7045. For example, the new service installation event can record service names and directory information, and may include evidence of malware installations. In some examples, the anomaly detection analytics module 102 can determine the rarity of directory paths by comparing sequences of character counts 132 of the folder names 124, instead of the character strings of the folder names 124. For example, the directory path 120 from a process creation event can be converted to a sequence of integers 132, each sequence of integers 132 denoting the number of characters for the corresponding sub-directory name. For example, the directory path 124 "C:\Windows\System32\Microsoft\" can be represented by the sequence of integers 132 of (2, 7, 8, 9,). The "C:" can be represented by the integer 2, "Windows" can be represented by the integer 7, "System32" can be represented by the integer 8, and "Microsoft" can be represented by the integer 9. In some examples, user names can be removed from the directory paths. In some examples, the anomaly detection analytics module 102 can label events with sequences of integers 132 occurring fewer than a threshold number of times as potentially malicious. For example, similar character counts can be compared against a threshold number to determine whether the processes associated with the directory paths may be anomalous. For example, a process with a directory path that is unique and therefore has a character count that appears less than a threshold number of times can be detected as anomalous. In some examples, process names can be compared 138 and less common names can be detected as anomalous. In some examples, known benign processes can be filtered out before the comparison 138. Feedback 118 can be received based on initially detected anomalous processes to filter out additional processes that may be benign from future detection. Thus, the present techniques can also address a problem of detecting an excess number of false positives having unique sub-directory paths with GUIDs since sub-directory GUIDs have the same character lengths. As a result, they need not be rare with respect to character counts and need not be falsely detected as anomalous.

Still referring to FIG. 1, once anomaly detection analytics module 102 labels events as potentially linked to malware, additional querying logic of the filtering and auto-classification module 108 can be applied to filter known rare yet benign process creations and auto-classify patterns of processes linked with grayware or adware. In some examples, after processing the events, the filtering and auto-classification logic 108 can send the remaining anomalies 112 to be displayed to security experts for investigation. For example, the remaining anomalies 112 can be displayed at a client 116. In return, the filtering and auto-classification logic 108 can receive false positive instances and use the false positive instances to update.

The diagram of FIG. 1 is not intended to indicate that the example system 100 is to include all of the components shown in FIG. 1. Rather, the example system 100 can include fewer or additional components not illustrated in FIG. 1 (e.g., additional modules, clients 116, etc.).

Figure 2:
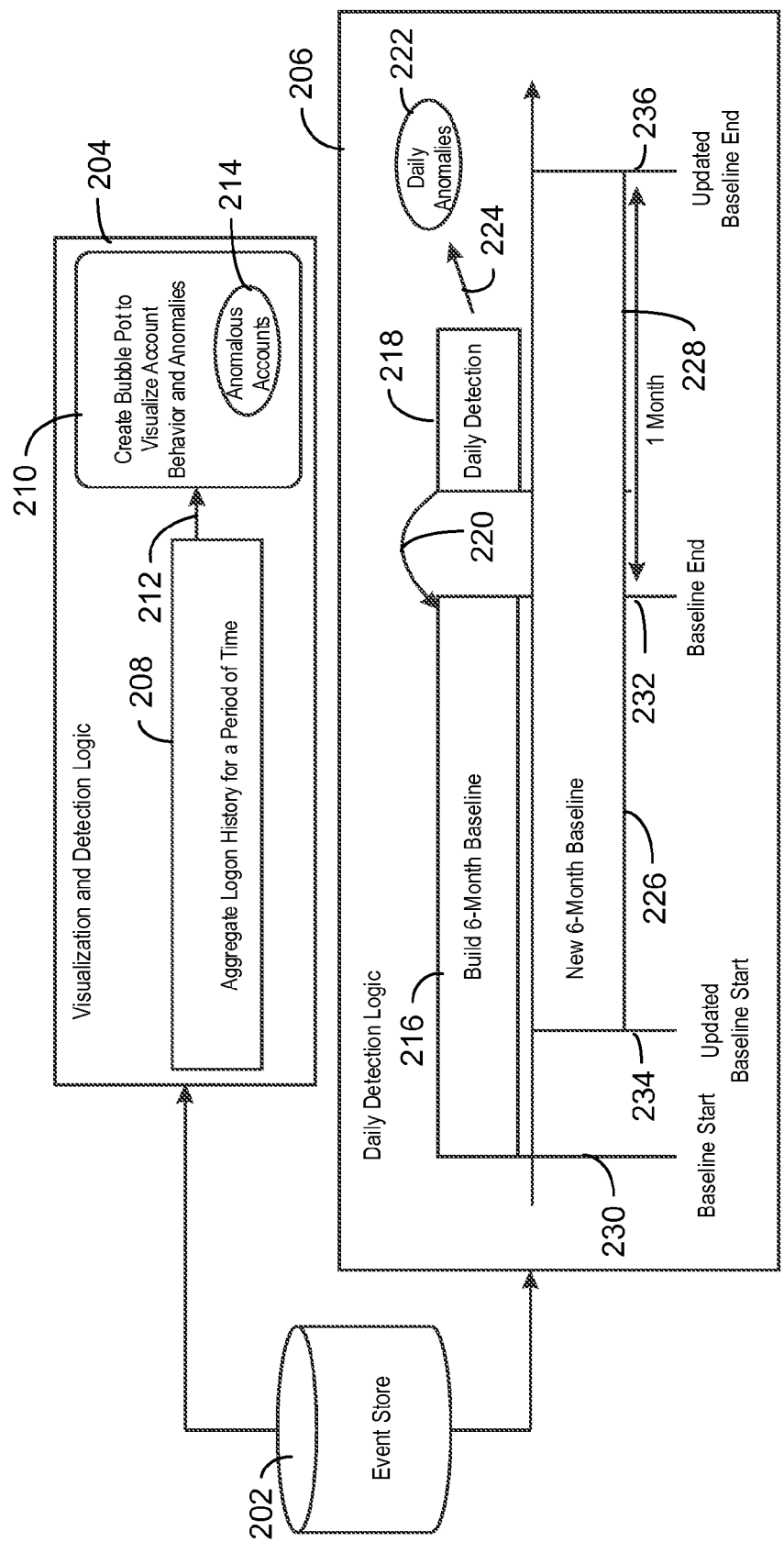
FIG. 2 is a block diagram of an example system for detecting anomalous accounts.

FIG. 2 is a block diagram of an example system for detecting anomalous accounts. The example system 200 can be implemented using the computer 702 as described below.

The example system 200 can include an event store 202 that is communicatively connected to a visualization and detection logic 204 for visualizing and detecting anomalous accounts. The event store 202 can also be communicatively connected to a daily detection logic 206 for daily detection of anomalous events against a baseline. At block 208, the visualization and detection logic 204 for visualizing and detecting anomalous accounts aggregates an event history for a predetermined amount of time. At block 210, the visualization and detection logic 204 creates a bubble plot graph from the aggregated logon history as indicated by an arrow 212. At block 216, the daily detection logic 206 builds an initial baseline. At block 218, the daily detection logic 206 performs daily detection by comparing logon accounts to the initial baseline as indicated by arrow 220. The daily detection logic 206 can also detect one or more daily anomalies 222 as indicated by an arrow 224. At block 226, the daily detection logic 206 creates a new baseline that includes a new month 228 of data. FIG. 2 also shows a baseline start marker 230 for the initial baseline 216 and a baseline end marker 232 for the initial baseline 216. An updated baseline start marker 234 and updated baseline end marker 236 is also shown for the updated baseline block 226.

In the example system 200 of FIG. 2, the event store 202 can include a plurality of events. For example, the events can include logon events to a list of machines. The list of machines can include information technology machines such as Domain Controller and Certificate Authority servers. The event store 202 can be accessed by a visualization and detection logic 204 for visualizing and detecting anomalous accounts. At block 208, the visualization and detection logic 204 aggregates a logon history for a period of time. For example, the predetermined amount of time can be two months or six months. In some examples, for a given list of machines, logons from any accounts to these host machines are collected for a period of time and stored in the event store 202. For example, a given list may contain those host machines with names containing "-dc-", which indicates that the host machines are Domain Controller servers. The block 208 can then aggregate the events to provide, for each account, the total number of logons and a most recent and earliest time of logon across all machines from the list. At block 210, the visualization and detection logic 204 creates a bubble plot graph from the aggregated logon history as indicated by an arrow 212. For example, the bubble plot graph may resemble the example bubble plot graph of FIG. 3 below.

In some examples, the event store 202 can be accessed by a daily detection logic 206 that can store events recorded over a period of time as a baseline 216. For example, the baseline 216 can include all logons to machines from any accounts recorded over a six month period. In FIG. 2, the period for baseline 216 begins at a baseline start time 230 and ends at a baseline end time 232. At block 218, the daily detection logic 206 collects logon events each day and compares the daily logon events to the baseline 216. The daily detection logic 206 can label any account that has not been detected logging onto a machine in the baseline as anomalous. At block 224, the daily detection logic 206 adds anomalous accounts to a store of daily anomalies 222. After a predetermined amount of time, the daily detection logic 206 can update the baseline 216 by removing the older events and including all logon events not labeled as anomalous of the most current time period. For example, given a predetermined amount of time of six months, events from a first month in six months can be removed and logon events from a recent month of collection can be added. Thus, a new baseline 226 can include all captured events from the updated baseline start time 234 to the updated baseline end time 236. Similar to the anomaly detection analytics module 102 in example system 100 above, which is general enough for any rare directory and process name detection, the baseline 216 can also be based on other types of events. For example, the events can include events that are triggered when members are added to global and/or local groups of a machine.

Thus, the present techniques save resources such as processor power and bandwidth that may have otherwise been spent on testing false positives. Furthermore, the techniques reduce the risk of undetected malicious behavior by providing a manageable number of daily anomalies for review. In addition, the techniques provide the ability to easily visualize anomalous accounts and suspicious logon activity for wide audiences.

The diagram of FIG. 2 is not intended to indicate that the example system 200 is to include all of the components shown in FIG. 2. Rather, the example system 200 can include fewer or additional components not illustrated in FIG. 2 (e.g., additional events 202, logic, blocks, etc.).

Figure 3:
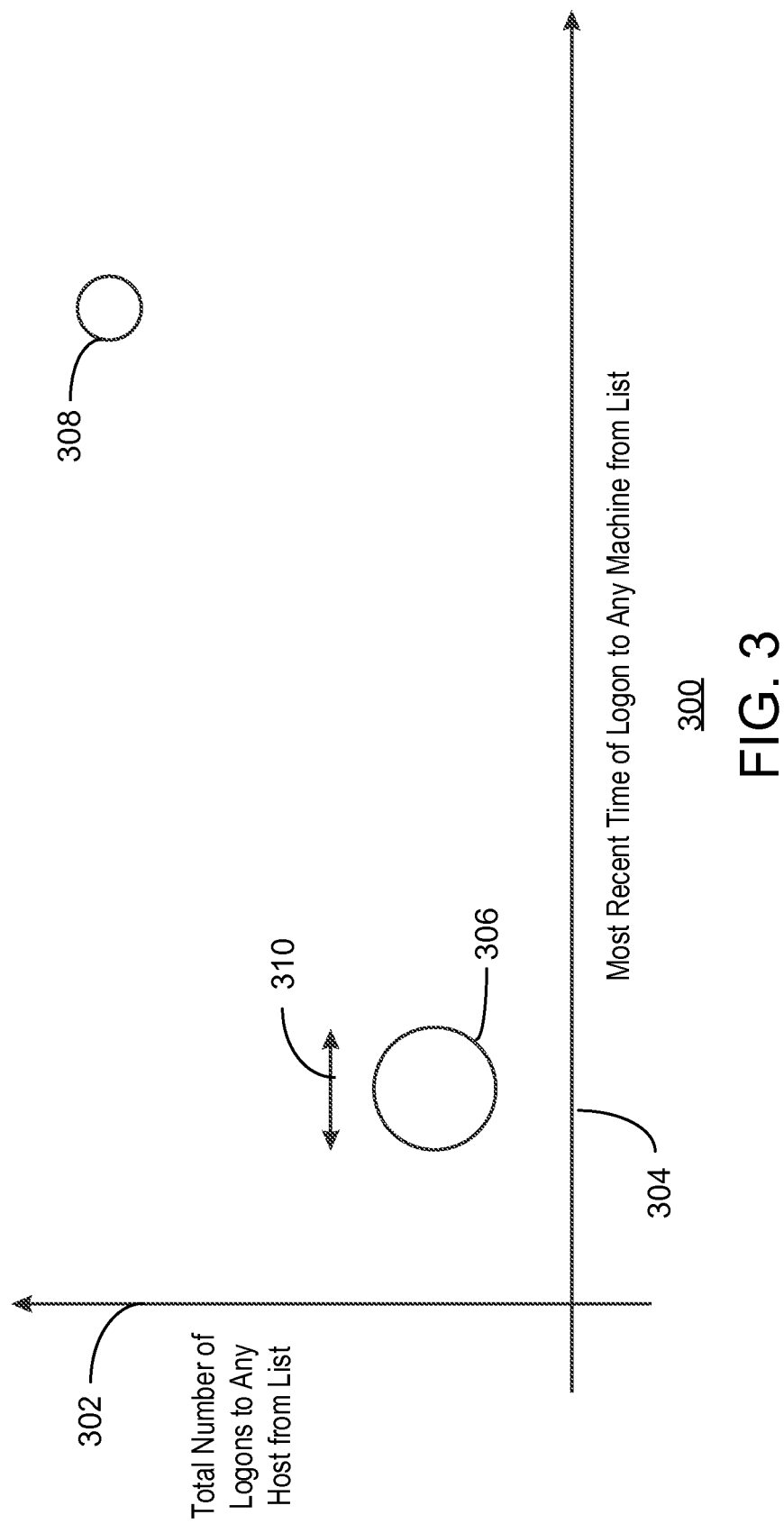
FIG. 3 is an example bubble plot graph according to techniques described herein.

FIG. 3 is an example bubble plot graph according to techniques described herein. The example bubble plot graph is referred to generally by the reference number 300.

In the example bubble plot graph 300, the vertical axis 302 represents a total number of logons for an account to any host from a list of host machines. The horizontal axis 304 represents the most recent time of an account logon to any machine from the list of host machines. Two accounts 306 and 308 are indicated by bubbles. The account 306 has a size 310 inversely indicating the difference between the time of the most recent logon and the time of the earliest logon for the account. The size 310 of the representative bubble for the account 306 is larger than the size of bubble for the account 308, which indicates that account 306 has less time difference between a most recent logon and earliest logon for the account. Therefore, account 306 is more likely to be anomalous than account 308 because the logon history of account 306 resides in a smaller time frame.

In the example bubble plot graph 300, the total logons 302 for each account is plotted against the most recent logon 304. In addition, the size 310 of each bubble reflects a third dimension representing the inverse difference between the time of most recent logon for a particular account and the time of the earliest logon for the account. For example, an account that has a larger difference between the most recent logon and earliest logon can have a smaller bubble. Bubble size 310 can reflect that accounts with longer histories of use are less anomalous than accounts with less history. In addition, an account with a lower total number of logons to any host from the list is more likely to be anomalous. As indicated by horizontal axis 304, accounts with more recent logon times are also considered less anomalous. Thus, account 306 is more anomalous by all three measures: account 306 has a lower total number of logons, a less recent logon time, and a smaller difference between the most recent logon time and the earliest logon time. Account 308, on the other hand, displays less anomaly by all three measures. Account 308 has a higher total number of logons 302 and a more recent time of log. Moreover, account 308 is represented by a smaller bubble indicating a larger time difference between a last logon time associated with account 308 and an earliest logon time associated with account 308. Since benign accounts for IT servers generally exhibit consistent logon behavior, accounts showing high levels of abnormality may have a low number of logons, a most recent time of logon in the far past indicating a long period of account inactivity, and small time differences between most recent and earliest logon. Thus, anomalous accounts can be concentrated in the bottom-left corner of the plot and have larger bubble sizes as compared to benign accounts. In some examples, threshold selections can be made to label accounts as anomalous and thus to be investigated further by security analysts. For example, the thresholds can be based on number of logons and most recent time of logon. Thus, accounts that are anomalous will be larger and/or grouped in the bottom left side of the bubble plot graph, improving the ability of user to detect anomalous accounts and provide feedback as to whether the accounts and/or activities are benign or malicious. Accounts demonstrating abnormalities can be thus easier to detect using the present techniques.

The graph of FIG. 3 is not intended to indicate that the example bubble plot graph 300 is to include all of the components shown in FIG. 3. Rather, the example bubble plot graph 300 can include fewer or additional components not illustrated in FIG. 3 (e.g., additional accounts, dimensions, etc.).

Figure 4:
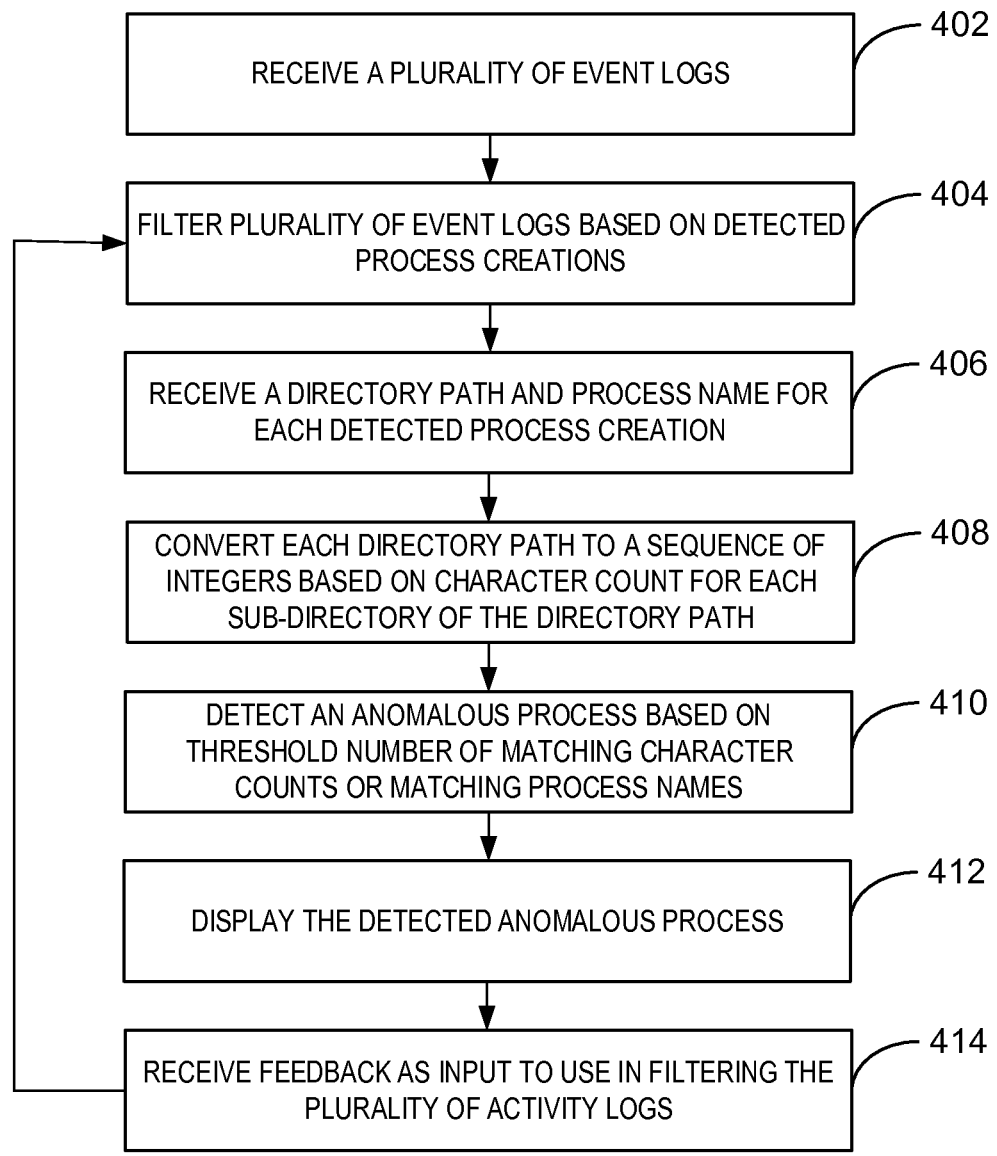
FIG. 4 shows a process flow diagram of an example method for detecting anomalous processes.

FIG. 4 shows a process flow diagram of an example method for detecting anomalous processes. The method is generally referred to by the reference number 400 and can be implemented using the computer 702 as described below. The example method 400 can be performed by the anomaly detection analytics module 102 shown in FIG. 1.

At block 402, a plurality of event logs is received. For example, event logs can be pulled for daily for processing. The event logs can include a plurality of process creations with the corresponding directory path and process name for each process creation. The event logs can be saved to storage. In some examples, the event logs are processed and stored as a common structured table format. In some examples, the event logs can be compressed using an ORC format.

At block 404, the plurality of event logs are filtered based on detected process creations. For example, the process creations can be instances of Event 4688. In some examples, the process creations can be filtered based on specific sub-directory paths where malware are likely to be found. For example, the directories can include common sub-directories for a particular operating system. In some examples, processes with rare-occurring names or directory paths can be labeled as potentially associated with malware installations. In some examples, user-identified sub-directories can be ignored during the filtering. For example, the user-identified sub-directories can be received from the feedback in block 414 below. In some examples, patterns of processes linked with malware or grayware can automatically classified as anomalous. For example, grayware processes can include spyware or adware processes. In some examples, the event logs can be filtered to include events such as service installations and additions or removals of members from groups. For example, the event logs can include Event Log 4697 indicating a service was installed on a system.

At block 406, a directory path and process name is received for each detected process creation. For example, the directory path can be strings of sub-directories separated by slash symbols. In some examples, strings including user names can be removed from the directory paths. For example, the path "C:/root/Alice/directory" may be shortened to "C:/root/directory." In some examples, a directory path and process name can be received for each detected service installation. In some examples, a directory path and process names are detected for each detected service installation.

At block 408, each directory path is converted to a sequence of integers based on character count for each sub-directory of the directory path. The directory path 120 from each process creation event can be converted to a sequence of integers 132, each sequence of integers 132 denoting the number of characters for the corresponding sub-directory name. For example, the directory path "C:/root/example/directory/" can be represented as "(2, 4, 7, 9)".

At block 410, an anomalous process is detected based on threshold number of matching character counts or matching process names. In some examples, anomalous directory paths can be determined by comparing sequences of character counts of the folder names, instead of the character strings of the folder names. For example, if the sequence (2, 4, 7, 9) only occurs less than a threshold amount of times, then the corresponding process with that directory path can be detected as anomalous. In some examples, events with directory paths having sequences of integers, or with process names, occurring n or fewer times overall can be labeled as anomalous, wherein n is a threshold number of similar instances. In some examples, the names of the processes are compared against a list of process names. For example, the list can include process names that are system processes. The detected process names can be compared against the list of process names and also be used to detect anomalous processes. For example, if a process creation has an anomalous directory path sequence and a process name that is similar or identical to a list of system processes, then such process creation can be detected as anomalous. In some examples, process names that are similar to the list of system processes and in the same directory paths as the similar system processes can be detected as anomalous. Service installations into similar directory paths can also be detected as anomalous. Thus, processes and service installations additions that could be easily overlooked by human users due to the similarity of process name can be detected as anomalous and therefore subject to further review.

At block 412, the detected anomalous process is displayed. For example, the anomalous process can be displayed in a list of directories for a security expert to further investigate. The security expert may determine whether the anomalous process is malicious or not. In some examples, anomalous service installations can also be displayed.

At block 414, feedback is received as input to use in filtering the plurality of activity logs. For example, false positives can be identified by security experts and received by the filtering and auto-classification module 108. The filtering and auto-classification module 108 can then update its list of benign processes and filter such processes out at an early stage in later analysis. For example, process creations with a particular combination of character count sequence and process name can be excluded from future anomaly analysis by the filtering and auto-classification module 108. In some examples, service installations that were detected as anomalous can also be added to the filter to be excluded from future anomaly analysis and detection.

This process flow diagram is not intended to indicate that the blocks of the method 400 are to be executed in any particular order, or that all of the blocks are to be included in every case. Further, any number of additional blocks not shown may be included within the method 400, depending on the details of the specific implementation.

Figure 5:
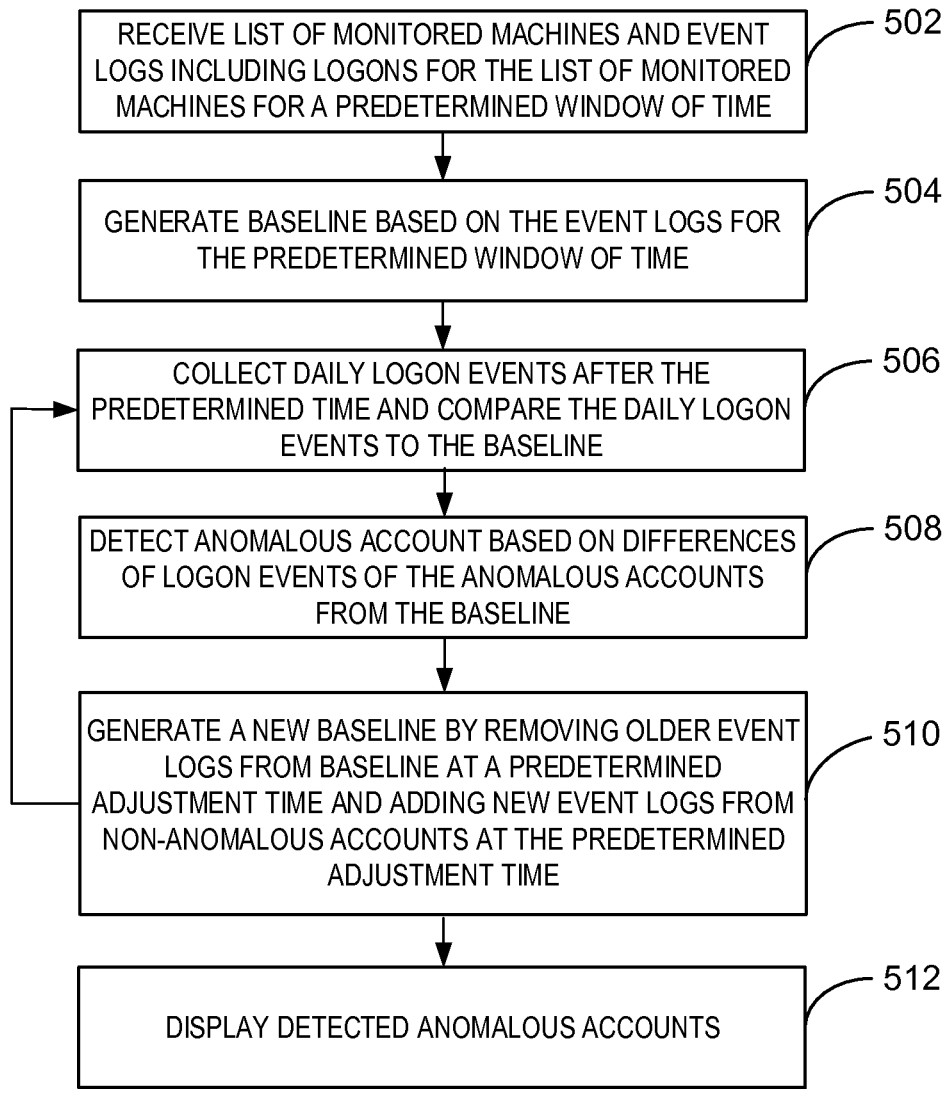
FIG. 5 shows a process flow diagram of an example method for detecting anomalous accounts.

FIG. 5 shows a process flow diagram of an example method for detecting anomalous accounts. The example method is generally referred to by the reference number 500 and can be implemented using computer 702 as described below. The example method 500 can be performed by the example system 200.

At block 502, a list of monitored machines and event logs including logons for the list of monitored machines for a predetermined window of time is received. For example, the predetermined window of time can be six months. In some examples, the event logs can include additions of new members to groups. For example, the event logs can include instances of Event Log 4728, wherein a member is added to a security-enabled global group.

At block 504, a baseline is generated based on the event logs for the predetermined window of time. For example, the baseline can include all accounts in the predetermined window of time that were not detected as anomalous or determined to be false positives. In some examples, the baseline can include membership additions that were not detected as anomalous or determined to be safe. The baseline can represent normal account behavior for the predetermined window of time. For example, the behavior of an individual account can be used to generate a baseline for that account. An account may, for example, only logon to one server. In some examples, the behavior of a plurality of accounts can be used to generate the baseline. For example, a server that is rarely logged onto may be left out of the baseline. In some examples, security-sensitive servers can also be left out of the baseline. Thus, any logons to security-sensitive servers can be detected as anomalous.

At block 506, daily logon events after the predetermined time are collected and compared to the baseline. For example, the account ID and server for each logon event can be extracted and compared to the account IDs and servers in the generated baseline. In some examples, membership additions after the predetermined time can also be collected and compared to the baseline.

At block 508, anomalous accounts can be detected based on differences of the logon events of the anomalous accounts from the baseline. For example, if an account detected in a daily pull of events is not present in the baseline, then the account can be labeled anomalous. If an account from a daily pull of events is found in the baseline, then the account can be labeled benign. In some examples, if an account logs on to a server that is outside its baseline of normal logons, then the logon can be detected as anomalous. In some examples, logons to servers that are rarely logged on to can be detected as anomalous. In some examples, new membership additions that differ from baseline membership additions can be detected as anomalous.

At block 510, a new baseline is generated by removing older event logs from baseline at a predetermined adjustment time and adding new event logs from non-anomalous accounts at the predetermined adjustment time. For example, the predetermined adjustment time can be a month. Given a predetermined window of time of six months, in some examples, the first month of event logs can be removed and the newest month of recorded event logs added to the baseline. Thus, the new baseline is based on the latest six months of event logs. In some examples, the predetermined window of time can be a moving window that can be readjusted every hour, day, or month. In this manner, the activities that are considered normal behavior for an account may change over time and thus adapt to any changes in the environment.

At block 512, the detected anomalous accounts are displayed. For example, the anomalous accounts can be displayed at one or more client machines for further analysis. In some examples, the anomalous accounts can be displayed in a bubble graph according to the techniques described in FIG. 6 below. In some examples, anomalous membership additions can also be displayed.

This process flow diagram is not intended to indicate that the blocks of the method 500 are to be executed in any particular order, or that all of the blocks are to be included in every case. Further, any number of additional blocks not shown may be included within the method 500, depending on the details of the specific implementation.

Figure 6:
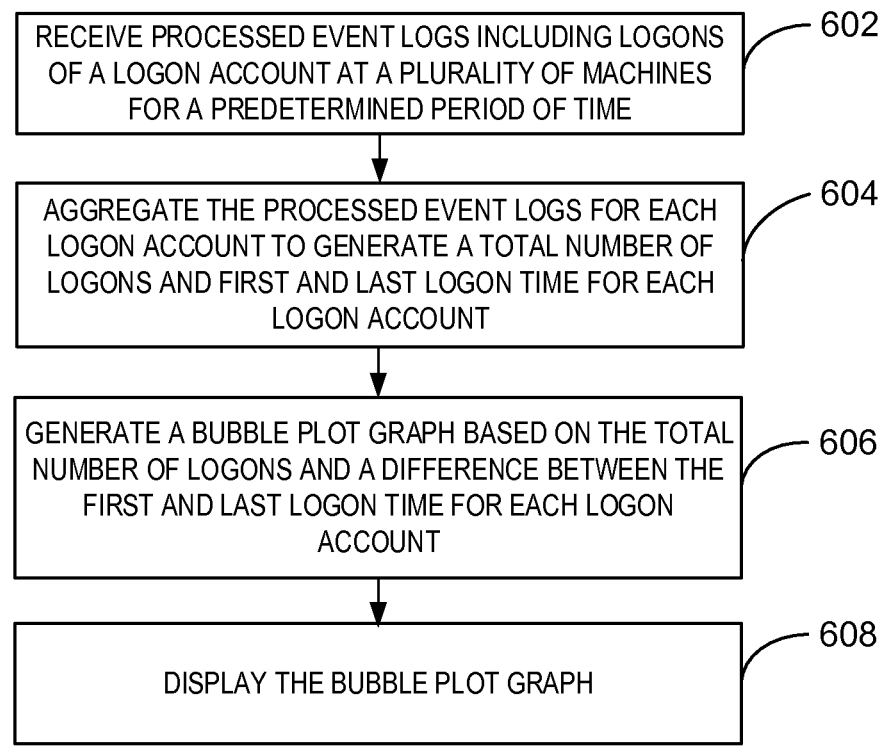
FIG. 6 shows a process flow diagram of an example method for generating a bubble plot graph of anomalous logons.

FIG. 6 shows a process flow diagram of an example method for generating a bubble plot graph of anomalous logons. The method is generally referred to by the reference number 600 and can be implemented using computer 702 as described below. The example method 600 can be performed by the example system 200 to generate a bubble plot graph, an example of which is shown in FIG. 3.

At block 602, processed event logs including logons of a logon account at a plurality of machines for a predetermined period of time are received. For example, the period of time can be six months.

At block 604, the processed event logs for each logon account is aggregated to generate a total number of logons, and first and last logon time for each logon account. For example, for a given account, the total number of logons can be aggregated for the predetermined period of time. The first and last logon time for the account within the predetermined period of time can also be determined for the predetermined period of time. In some examples, a difference between the last logon time and the first logon time can also be calculated.

At block 606, a bubble plot graph is generated based on the total number of logons and the difference between the first and last logon time for each logon account. For example, the total number of logons can be represented on a vertical axis as shown in FIG. 3 above. As regular accounts exhibit habitual patterns, accounts with less logons can be treated with more suspicion. In some examples, the most recent time of a logon to any machine can be represented on the horizontal axis. Accounts that have not logged into any machine in a long time can be treated with more suspicion. In some examples, the difference in time between the first and last logon time for each account can be represented inversely by the bubble size of the represented account. More precisely, the bubble size can be defined as the mathematical inverse of last logon time minus first logon time, expressed in some quantitative measurement of time, for example, the difference in terms of number of days, hours, weeks, etc. Other formulas of computing this inverse difference can include $1-(x\_a/\max(x\_a))$, where $x\_a$ is the difference in time between the last and first logon times for an account a. Thus, accounts falling in the bottom left corner are more likely to be malicious. For example, such account activity may indicate a stolen account or a malicious intent. In some examples, activities that are unauthorized may also be discovered. For example, the use of a root account with privileges greater than authorized can also be discovered.

At block 608, the bubble plot graph 300 is displayed. For example, the bubble plot graph 300 can be displayed at a client.

This process flow diagram is not intended to indicate that the blocks of the method 600 are to be executed in any particular order, or that all of the blocks are to be included in every case. Further, any number of additional blocks not shown may be included within the method 600, depending on the details of the specific implementation.

FIG. 7 is intended to provide a brief, general description of a computing environment in which the various techniques described herein may be implemented. For example, a method and system for detecting anomalous logons described in FIGS. 1-6 can be implemented in such a computing environment. While the claimed subject matter is described below in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 7 is a block diagram of an example operating environment configured for implementing various aspects of the techniques described herein. The example operating environment 700 includes a computer 702. The computer 702 includes a processing unit 704, a system memory 706, and a system bus 708.

The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure, including the memory bus or memory controller, a peripheral bus or external bus, and a local bus using any variety of available bus architectures known to those of ordinary skill in the art. The system memory 706 includes computer-readable storage media that includes volatile memory 710 and nonvolatile memory 712.

The basic input/output system (BIOS), containing the basic routines to transfer information between elements within the computer 702, such as during start-up, is stored in nonvolatile memory 712. By way of illustration, and not limitation, nonvolatile memory 712 can include read-only memory (ROM), programmable ROM (PROM), electrically programmable ROM (EPROM), electrically erasable programmable ROM (EEPROM), or flash memory.

Volatile memory 710 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 702 also includes other computer-readable media, such as removable/non-removable, volatile/nonvolatile computer storage media. FIG. 7 shows, for example a disk storage 714. Disk storage 714 includes, but is not limited to, devices like a magnetic disk drive, floppy disk drive, tape drive, Jaz drive, Zip drive, LS-210 drive, flash memory card, or memory stick. In some examples, the disk storage 714 can be formatted using the Hadoop Distributed File System (HDFS). For example, an HDFS cluster can include a NameNode that manages the file system metadata and DataNodes that store the actual data.

In addition, disk storage 714 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface is typically used such as interface 716.

It is to be appreciated that FIG. 7 describes software that acts as an intermediary between users and the basic computer resources described in the suitable operating environment 700. Such software includes an operating system 718. Operating system 718, which can be stored on disk storage 714, acts to control and allocate resources of the computer 702.

System applications 720 take advantage of the management of resources by operating system 718 through program modules 722 and program data 724 stored either in system memory 706 or on disk storage 714. It is to be appreciated that the claimed subject matter can be implemented with various operating systems or combinations of operating systems.

A user enters commands or information into the computer 702 through input devices 726. Input devices 726 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 726 connect to the processing unit 704 through the system bus 708 via interface ports 728. Interface ports 728 include, for example, a serial port, a parallel port, a game port, and a universal serial bus (USB).

Output devices 730 use some of the same type of ports as input devices 726. Thus, for example, a USB port may be used to provide input to the computer 702, and to output information from computer 702 to an output device 730.

Output adapter 732 is provided to illustrate that there are some output devices 730 like monitors, speakers, and printers, among other output devices 730, which are accessible via adapters. The output adapters 732 include, by way of illustration and not limitation, video and sound cards that provide a means of connection between the output device 730 and the system bus 708. It can be noted that other devices and systems of devices provide both input and output capabilities such as remote computers 734.

The computer 702 can be a server hosting various software applications in a networked environment using logical connections to one or more remote computers, such as remote computers 734. The remote computers 734 may be client systems configured with web browsers, PC applications, mobile phone applications, and the like. The remote computers 734 can be a personal computer, a server, a router, a network PC, a workstation, a microprocessor based appliance, a mobile phone, a peer device or other common network node and the like, and typically includes many or all of the elements described relative to the computer 702.

Remote computers 734 can be logically connected to the computer 702 through a network interface 736 and then connected via a communication connection 738, which may be wireless. Network interface 736 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection 738 refers to the hardware/software employed to connect the network interface 736 to the bus 708. While communication connection 738 is shown for illustrative clarity inside computer 702, it can also be external to the computer 702. The hardware/software for connection to the network interface 736 may include, for exemplary purposes, internal and external technologies such as, mobile phone switches, modems including regular telephone grade modems, cable modems and DSL modems, ISDN adapters, and Ethernet cards.

An example processing unit 704 for the server may be a computing cluster. Additionally, the disk storage 714 can store various types of data 724 used to detect anomalous events and accounts. For example, the disk storage 714 may comprise an enterprise data storage system, for example, storing data 724 such as event logs. An event log, as used herein, refers to a file containing a plurality of recorded events. For example, the logs can be received in a native XML format and processed into a common structured table format and inserted in a disk storage 714 for querying and analytics purposes. For example, the disk storage can be a Hadoop Distributed File System (HDFS). In some examples, the number of events processed each day can number in the billions. For example, tens of thousands of events can be receive and processed per second. Thus, in some examples, the event logs can be compressed into Optimized Row Columnar (ORC) format before being inserted into the disk storage. In some examples, error-handling and re-run procedures can also be used to prevent loss or corruption of data 724.

The computer 702 includes one or more modules 722 configured to perform detection of anomalous processes and accounts, including an event log module 740, a filter module 742, a receiving module 744, a conversion module 746, a baseline module 748, a detection module 750, a baseline module 752, a collector module 754, an aggregator module 756, a graphing module 758, an update module 760, and a display module 762. The event log module 740 can receive a plurality of event logs. The filter module 742 can filter the plurality of event logs based at least in part on detected process creations. The receiving module 744 can receive a directory path and process name for each detected process creation. The directory path is the location on a network server where the executable file resides. In some examples, the directory path may be a path on a logical file system implemented one or more nodes of a cloud service. For example, event logs from thousands of machines can be pushed to event collector systems and transferred to folders shared with processing systems. In some examples, the event logs can be processed from a native XML format into a common structure table format. The event logs can then be inserted into a Hadoop Distributed File System (HDFS) storage for querying and analytics purposes. Once a directory path and process name is received by the receiving module 744, the conversion module 746 can convert each directory path to a sequence of integers based on character count. Each integer in the sequence of integers describes the number of characters in the corresponding sub-directory name. In some examples, the detection module 752 can detect the anomalous process by determining whether a number of matching sequences falls below a threshold number of matches for a given sequence. In some examples, the detection module 752 can match a process within an error of two characters to a process name on a list of process names. In some examples, anomalous processes may be potentially malicious activities. The detection module 752 can further detect an anomalous process based on a threshold number of matching character counts or matching process names. For example, if a process name matches within an error of two characters a process name on a list of process names, then an anomalous process can be detected. The display module 762 can cause the anomalous process to be displayed, for example, by sending the anomalous process for display to a client device.

In some examples, the receiving module 744 can be configured to receive user feedback as input to use in filtering and auto-classification of the plurality of event logs. The event logs can include one or more anomalous processes. For example, the anomalous processes may be malicious processes or suspicious activities. In some examples, the plurality of event logs can also be filtered based on known benign processes. For example, a list of known benign processes may be received from a client by the detection module 750 and processes with the same name can be filtered from the plurality of event logs. In some examples, the detection module 750 can automatically classify patterns of processes linked with grayware and filter the plurality of event logs based on the patterns. For example, grayware can include spyware, adware, dialers, joke programs, remote access tools, and any other unwelcome files and programs apart from viruses that are designed to harm the performance of computers on a network.

In some examples, the receiving module 744 can receive a list of monitored machines and event logs including logons for the list of monitored machines for a predetermined window of time. The baseline module 748 can generate a baseline based on the event logs for a predetermined window of time. For example, the predetermined window of time can be six months. The collector module 754 can also collect daily logon events after the predetermined time and compare the daily logon events to the baseline. The detection module 750 can detect anomalous accounts based on a difference of the logon events of the anomalous account from the baseline. The display module 762 can then display the detected anomalous accounts. The operation of the baseline module 748 is discussed in greater detail with respect to FIG. 2 above.

In some examples, the receiving module 744 can receive processed event logs including logons of a logon account at a plurality of machines for a predetermined time. In some examples, the aggregator module 756 can aggregate the processed event logs for each logon account to generate a total number of logons, and a first and a last logon time for each logon account. The graphing module 758 can then generate a bubble plot graph based on the total number of logons and a difference between the first and the last logon time for each logon account and a size of the bubble indicating an inverse difference between the first logon and the last logon for the logon account. The display module 762 can then display the bubble plot graph on a client for further analysis. In some examples, the logon account can be one of a plurality of logon accounts to be represented by bubbles in the bubble plot graph. In some examples, the graphing 758 module can receive an input from a user and remove a bubble from the graph. In some examples, the bubble graph can include an axis representing the last logon time for the logon account. In some examples, the bubble plot graph can include an axis representing the total number of logons for the account. The operation of the graphing module 758 is discussed in greater detail with respect to FIG. 3 above.

It is to be understood that the block diagram of FIG. 7 is not intended to indicate that the computing system 700 is to include all of the components shown in FIG. 7. Rather, the computing system 700 can include fewer or additional components not illustrated in FIG. 7 (e.g., additional applications, additional modules, additional memory devices, additional network interfaces, etc.). Furthermore, any of the functionalities of the event log module 740, the filter module 742, the receiving module 744, the conversion module 746, the baseline module 748, the detection module 750, the baseline module 752, the collector module 754, the aggregator module 756, the graphing module 758, the update module 760, and the display module 762, can be partially, or entirely, implemented in hardware and/or in a processor. For example, the functionality can be implemented with an application specific integrated circuit, in logic implemented in the processor, or in any other device. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs), etc.

Figure 8:
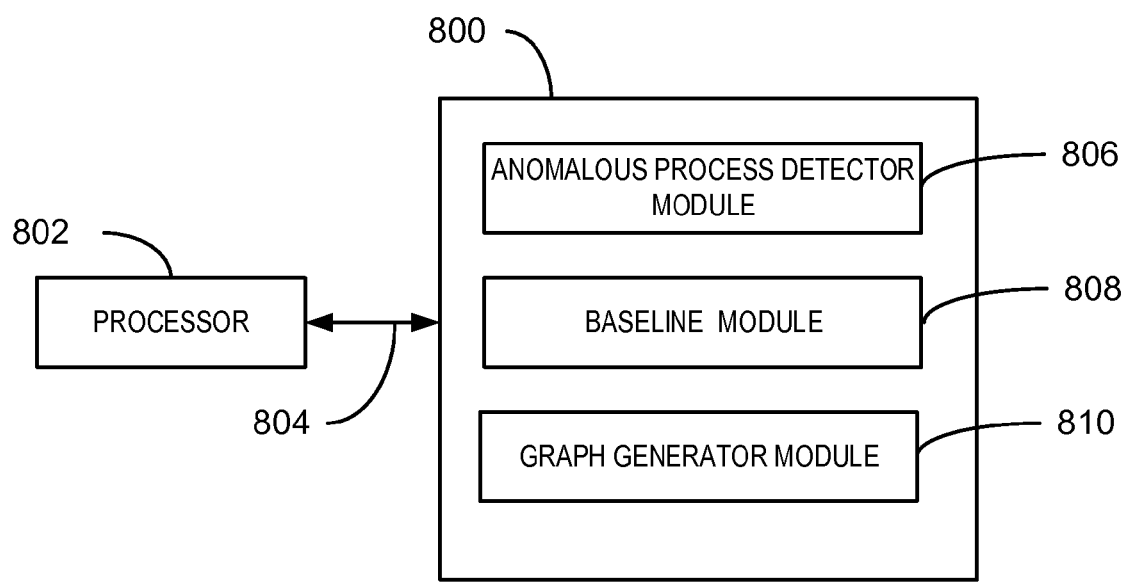
FIG. 8 is a block diagram of an example computer-readable storage medium that can be used to generate a bubble plot graph of anomalous logons.

FIG. 8 is a block diagram showing an example tangible, computer-readable storage medium that can be used to generate a bubble plot graph of anomalous logons. The tangible, computer-readable storage media 800 can be accessed by a processor 802 over a computer bus 804. Furthermore, the tangible, computer-readable storage media 800 can include code to direct the processor 802 to perform the current methods. For example, any combination of methods 400-600 can be performed by the processor 802.

The various software components discussed herein can be stored on the tangible, computer-readable storage media 800, as indicated in FIG. 8. For example, the tangible computer-readable storage media 800 can include an anomalous process detector module 806, a baseline module 808, and a graph generator module 810. In some implementations, the anomalous process detector module 806 includes code to receive a plurality of event logs. For example, the event logs can include logons of a plurality of machines for a predetermined time. The anomalous process detector module 806 can also include code to filter the plurality of event logs based on detected process creations. The anomalous process detector module 806 can also include code to receive a directory path and process name for each detected process creation. The anomalous process detector module 806 can also include code to convert each directory path to a sequence of integers based on a character count for each sub-directory of the directory path. The anomalous process detector module 806 can also include code to detect an anomalous process based on a threshold number of matching character counts. The anomalous process detector module 806 can also include code to display the anomalous process.

The baseline module 808 includes code to receive a list of monitored machines and event logs including logons for the list of monitored machines for a predetermined window of time. The baseline module 808 also includes code to generate a baseline based on the event logs for the predetermined window of time. The baseline module 808 can also include code to collect daily logon events after the predetermined time and compare the daily logon events to the baseline. The baseline module 808 can also include code to detect an anomalous account based a difference of logon events of the anomalous account from the baseline. The baseline module 808 can also include code to display the detected anomalous account.

The graph generator module 810 includes code to generate a bubble plot graph based on the total number of logons and a difference between the first and last logon time for each logon account. The graph generator module 810 can also include code to display the bubble plot graph. In some examples, the bubble plot graph can include a plurality of bubbles with sizes indicating an inverse difference between a first logon and last logon for each logon account.

It is to be understood that any number of additional software components not shown in FIG. 8 can be included within the tangible, computer-readable storage media 800, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

This example provides for an example system for anomalous process detection. The example system includes an event log module configured to receive a plurality of event logs. The example system also includes a filter module to filter the plurality of event logs based on detected process creations. The example system also includes a receiving module to receive a directory path and process name for each detected process creation. The example system also includes a conversion module to a sequence of integers based on a character count for each sub-directory of the directory path. The example system also includes a detection module to detect an anomalous process based on a threshold number of matching character counts and matching process names. The example system also includes a display module to display the detected anomalous process. Alternatively, or in addition, the receiving module can be further configured to receive user feedback as input to use in filtering and auto-classification of the plurality of event logs. Alternatively, or in addition, the detection module can be further configured to match a process within an error of two characters to a process name on a list of process names. Alternatively, or in addition, the detection module can be further configured to determine whether a number of matching sequences falls below a threshold number of matches for a given sequence. Alternatively, or in addition, the detection module can be configured to automatically classify patterns of processes linked with malware or grayware.

EXAMPLE 2

This example provides for an example system for detecting anomalous accounts. The example system includes a receiving module configured to receive a list of monitored machines and event logs including logons for the list of monitored machines for a predetermined window of time. The example system includes a baseline module configured to generate a baseline based on the event logs for the predetermined window of time. The example system also includes a collector module configured to collect daily logon events after the predetermined time and compare the daily logon events to the baseline. The example system further includes a detection module configured to detect an anomalous account based on a difference of logon events of the anomalous account from the baseline. The example system also further includes an update module configured to generate a new baseline by removing older event logs from the baseline based on a predetermined adjustment time and adding new event logs from non-anomalous accounts based on the predetermined adjustment time and comparing daily logon events to the new baseline. The example system also includes a display module configured to display the detected anomalous account. Alternatively, or in addition, the update module can be further configured to generate a new baseline by removing older event logs from the baseline based on a predetermined adjustment time and adding new event logs from non-anomalous accounts based on the predetermined adjustment time and comparing daily logon events to the new baseline. Alternatively, or in addition, the example system can also include a graphing module to generate a bubble plot graph to visualize account behavior and the detected anomalous accounts. Alternatively, or in addition, the baseline module can be further configured to format the event logs into a table format. Alternatively, or in addition, the table format can be an Optimized Row Columnar (ORC) format.

EXAMPLE 3

This example provides for an example system for generating bubble plot graphs. The example system includes a receiving module configured to receive processed event logs including logons of a logon account at a plurality of machines for a predetermined time. The example system also includes an aggregator module configured to aggregate the processed event logs for the logon account to generate a total number of logons, and a first and a last logon time for the logon account. The example system also includes a graphing module configured to generate a bubble plot graph including a bubble based on the total number of logons and a difference between the first and the last logon time for the logon account and a size of the bubble indicating an inverse difference between the first logon and the last logon for the logon account. The example system also includes a display module configured to display the bubble plot graph. Alternatively, or in addition the logon account can be one of a plurality of logon accounts to be represented by bubbles in the bubble plot graph. Alternatively, or in addition, the graphing module can be further configured to receive an input and remove a bubble from the graph. Alternatively, or in addition, the bubble plot graph can also include an axis representing the last logon time for the logon account. Alternatively, or in addition, the bubble plot graph can also include an axis representing the total number of logons for the account.

EXAMPLE 4

This example provides for an example method for anomalous process detection. The example method can include receiving, via a processor, a plurality of event logs. The example method can also include filtering, via the processor, the plurality of event logs to detect process creations. The example method can further include receiving, via the processor, a directory path and process name for each detected process creation. The example method can also further include converting, via the processor, each directory path to a sequence of integers based on character count. The example method can also include detecting, via the processor, an anomalous process based on a threshold number of matching character counts. The example method can also further include displaying, via the processor, the detected anomalous process. Alternatively, or in addition, the example method may include receiving user feedback as input to use in filtering and auto-classification of the plurality of event logs. Alternatively, or in addition, the example method may include detecting an anomalous process based on matching process names. Alternatively, or in addition, the example method may include. Alternatively, or in addition, the example method may include calculating a confidence score that indicates a level of certainty of the comparison results and displaying the confidence score with an associated comparison result. Alternatively, or in addition, the example method may include filtering the plurality of event logs to detect service installations and detecting an anomalous service installation based on the threshold number of matching character counts. Alternatively, or in addition, the example method may include automatically classifying patterns of processes linked with malware or grayware.

EXAMPLE 5

This example provides for an example method for detecting anomalous accounts. The example method can include receiving, via a processor, a list of monitored machines and event logs including logons for the list of monitored machines for a predetermined window of time. The example method can also include generating, via the processor, a baseline based on the event logs for the predetermined window of time. The example method can further include collecting, via the processor, daily logon events after the predetermined time and comparing the daily logon events to the baseline. The example method can also further include detecting, via the processor, an anomalous account based on a difference of logon events of the anomalous account from the baseline. The example method can also include displaying, via the processor, the detected anomalous account. Alternatively, or in addition, the example method may include generating, via the processor, a new baseline by removing older event logs from the baseline based on a predetermined adjustment time and adding new event logs from non-anomalous accounts based on the predetermined adjustment time and comparing daily logon events to the new baseline. Alternatively, or in addition, the example method may include generating, via the processor, a bubble plot graph to visualize account behavior and the detected anomalous accounts. Alternatively, or in addition, the event logs can include additions of members to groups. Alternatively, or in addition, the example method can further include detecting an anomalous group membership addition based on a detected difference of the group membership addition from the baseline. Alternatively, or in addition, the example method may include compressing, via the processor, the event logs into an Optimized Row Columnar (ORC) format.

EXAMPLE 6

This example provides for an example method for generating a bubble plot graph. The example method can include receiving, via a processor, processed event logs including logons of a logon account at a plurality of machines for a predetermined time. The example method can also include aggregating, via the processor, the processed event logs for the logon account to generate a total number of logons, and a first and a last logon time for the logon account. The example method can further include generating, via the processor, a bubble plot graph based on the total number of logons and a difference between a first logon time and a last logon time for the logon account. The example method can also further include displaying, via the processor, the bubble plot graph. Alternatively, or in addition, the example method may include representing the difference between the first and last logon time for the account in the bubble plot graph via a bubble size. Alternatively, or in addition, the bubble size can indicate an inverse difference between a first logon and last logon for the account. Alternatively, or in addition, the example method may include representing the last logon time for the logon account along one axis of the bubble plot graph. Alternatively, or in addition, the example method may include representing the total number of logons for the account along one axis of the bubble plot graph.

EXAMPLE 7

This example provides for one or more computer-readable storage medium for storing computer readable instructions that, when executed by one or more processing devices, instruct the detection of anomalous processes. The computer-readable medium includes instructions to receive a plurality of event logs. The computer-readable medium also includes instructions to filter the plurality of event logs based on detected process creations. The computer-readable medium includes instructions to. Further, the computer-readable medium includes instructions to receive a directory path and process name for each detected process creation. The computer-readable medium also further includes instructions to convert each directory path to a sequence of integers based on a character count for each sub-directory of the directory path. The computer-readable medium also further includes instructions to detect an anomalous process based on a threshold number of matching character counts and matching process names. The computer-readable medium also further includes instructions to display the detected anomalous process. Alternatively, or in addition, the computer-readable medium may include instructions to receive user feedback as input to use in filtering and auto-classification of the plurality of event logs. Alternatively, or in addition, the computer-readable medium may include instructions to match a process within an error of two characters to a process name on a list of process names. Alternatively, or in addition, the computer-readable medium may include instructions to determine whether a number of matching sequences falls below a threshold number of matches for a given sequence. Alternatively, or in addition, the computer-readable medium may include instructions to automatically classify patterns of processes linked with malware or grayware.

EXAMPLE 8

This example provides for one or more computer-readable storage medium for storing computer readable instructions that, when executed by one or more processing devices, instruct the detection of anomalous accounts. The computer-readable medium includes instructions to receive a list of monitored machines and event logs including logons for the list of monitored machines for a predetermined window of time. The computer-readable medium also includes instructions to generate a baseline based on the event logs for the predetermined window of time. The computer-readable medium includes instructions to. Further, the computer-readable medium includes instructions to collect daily logon events after the predetermined time and compare the daily logon events to the baseline. The computer-readable medium also further includes instructions to detect an anomalous account based on a difference of logon events of the anomalous account from the baseline. The computer-readable medium also further includes instructions to generate a new baseline by removing older event logs from the baseline based on a predetermined adjustment time and adding new event logs from non-anomalous accounts based on the predetermined adjustment time and comparing daily logon events to the new baseline. The computer-readable medium also further includes instructions to display the detected anomalous account. Alternatively, or in addition, the computer-readable medium may include instructions to generate a new baseline by removing older event logs from the baseline based on a predetermined adjustment time and adding new event logs from non-anomalous accounts based on the predetermined adjustment time and comparing daily logon events to the new baseline. Alternatively, or in addition, the computer-readable medium may include instructions to generate a bubble plot graph to visualize account behavior and the detected anomalous accounts. Alternatively, or in addition, the computer-readable medium may include instructions to format the event logs into a table format. Alternatively, or in addition, the table format can be an Optimized Row Columnar (ORC) format.

EXAMPLE 9

This example provides for one or more computer-readable storage medium for storing computer readable instructions that, when executed by one or more processing devices, instruct the generation of bubble plot graphs. The computer-readable medium includes instructions to receive processed event logs including logons of a logon account at a plurality of machines for a predetermined time. The computer-readable medium also includes instructions to aggregate the processed event logs for the logon account to generate a total number of logons, and a first and a last logon time for the logon account. The computer-readable medium includes instructions to generate a bubble plot graph including a bubble based on the total number of logons and a difference between the first and the last logon time for the logon account and a size of the bubble indicating an inverse difference between the first logon and the last logon for the logon account. Further, the computer-readable medium includes instructions to display the bubble plot graph. Alternatively, or in addition, the logon account can be one of a plurality of logon accounts to be represented by bubbles in the bubble plot graph. Alternatively, or in addition, the computer-readable medium may include instructions to receive an input and remove a bubble from the graph. Alternatively, or in addition, the computer-readable medium may include instructions to generate an axis representing the last logon time for the logon account. Alternatively, or in addition, the computer-readable medium may include instructions to generate an axis representing the total number of logons for the account.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for anomalous process detection, comprising:
a processor; and
a memory device coupled to the processor, the memory device to store instructions that, when executed by the processor, cause the processor to:
receive a plurality of event logs;
filter the plurality of event logs based on detected process creations;
receive a directory path and process name for each detected process creation;
convert each directory path to a sequence of integers based on a character count for each sub-directory of the directory path;
detect an anomalous process based on a threshold number of matching character counts and matching process names, the processor to match a process within an error of two characters to a process name on a list of process names; and
display the detected anomalous process.

2. The system of claim 1, the processor to receive user feedback as input to use in filtering and auto-classification of the plurality of event logs.

3. The system of claim 1, the processor to determine whether a number of matching sequences falls below a threshold number of matches for a given sequence.

4. The system of claim 1, the processor to further automatically classify patterns of processes linked with malware or grayware.

5. A method for anomalous process detection, the method comprising:
receiving, via a processor, a plurality of event logs;
filtering, via the processor, the plurality of event logs to detect process creations;
receiving, via the processor, a directory path and process name for each detected process creation;
converting, via the processor, each directory path to a sequence of integers based on character count;
detecting, via the processor, an anomalous process based on a threshold number of matching character counts, wherein the processor matches a process within an error of two characters to a process name on a list of process names; and
displaying, via the processor, the detected anomalous process.

6. The method of claim 5, further comprising receiving user feedback as input to use in filtering and auto-classification of the plurality of event logs.

7. The method of claim 5, further comprising detecting an anomalous process based on matching process names.

8. The method of claim 5, further comprising filtering the plurality of event logs to detect service installations and detecting an anomalous service installation based on the threshold number of matching character counts.

9. The method of claim 5, further comprising automatically classifying patterns of processes linked with malware or grayware.

\* \* \* \* \*